United States Patent [19]

Burton

[11] 4,012,133
[45] Mar. 15, 1977

[54] SHOPPING AID DISPLAY VIEWER

[76] Inventor: James J. Burton, Mendenhall Drive, Winston-Salem, N.C. 27107

[22] Filed: Sept. 22, 1975

[21] Appl. No.: 615,397

[52] U.S. Cl. .................................. 353/25; 353/77
[51] Int. Cl.² ...................................... G03B 23/02
[58] Field of Search ............. 353/25, 26 R, 26 A, 353/27 R, 27 A, 74–78, 94, 122

[56] References Cited
UNITED STATES PATENTS

| 3,030,855 | 4/1962 | Miller | 353/94 |
| 3,292,489 | 12/1966 | Johnson | 353/25 |
| 3,373,654 | 3/1968 | Carolan | 353/94 |
| 3,566,370 | 2/1971 | Worthington | 353/25 |
| 3,689,930 | 9/1972 | Strickland | 353/122 |

Primary Examiner—Harry N. Haroian

[57] ABSTRACT

A shopping aid display viewer having a housing that supports a daylight viewing screen, a second viewing area, and a slide projector for projecting images onto the daylight viewing screen. Purchasable items such as wearing apparel, gifts, notions, accessories, athletic equipment, real estate, visitor attractions, or any particular product or service that one may wish to advertise are sequentially displayed automatically or manually on the viewing screen. Outlets displaying the items or services are simultaneously shown on the second viewing area as a map locator guide. An automatic telephone dialing device can then be actuated to contact a specific outlet or location if the viewer user so chooses.

10 Claims, 6 Drawing Figures

SHOPPING AID DISPLAY VIEWER

BACKGROUND, BRIEF SUMMARY, AND OBJECTIVES OF THE INVENTION

This invention relates generally to a shopping aid display viewer and more particularly to a device for showing photographic slides of consumer products or services such as motels, airline schedules, recreational areas, visitor attractions, restaurants, rental/sell property and other generally similar items or services in a programmed manner subject to automatic operation and selective regulation from time to time by users.

There is a broad and extremely useful application for an apparatus that will display items, services, and locations to a visitor or newcomer within a given area or location, simultaneously locate the outlet or area of interest on an accessible map, and make direct telephonic communication with the location automatically upon actuation by the user. Such a device will enable one not at all familiar with a given location to positively locate a desirable outlet or facility and determine, for example, if a specific commodity is available for purchase or if accommodations, food, or entertainment is available for a particular time.

The present invention has evolved from a recognition of the need expressed above and is made up in preferred form of a housing having a daylight viewing screen adapted for viewing from the front side images projected on the back, a conventional slide projector, a second viewing area carrying a locator map and electronically wired illuminating means to designate specific locations thereon, a telephone for automatically contacting the location desired, and a manually interruptible automatic control panel which coordinates the operation of the projector, the locator map, and the telephone so that a product or service location can be projected on the viewing screen, designated on the locator map, and reached by telephone automatically if desired by the consumer.

With the foregoing in mind, it is an express object of the present invention to provide a shopping aid display viewer for showing articles or services and their locations or addresses which information might be difficult or at least time-comsuming to accumulate by a visitor or newcomer to a certain locality.

Another object of the present invention is to provide telephonic means to make personal and immediate contact with an outlet or service location to arrange for the purchase of products or services.

A further object of the present invention is to show photographic slides of products, service, visitor attractions, recreational areas, and the like in a programmed manner giving general illustrations simultaneously with corresponding detailed information and making telephonic connection immediately thereafter.

Yet another object of the present invention is to provide controls for regulation by customers so that interesting products or service locations can be retained on the screen and studied for a desired period of time.

Other objects and advantages of the invention will become more apparent after consideration of the following detailed specification taken in conjunction with the accompanying drawings wherein like characters of reference designate like parts throughout the several views.

FIGURE DESCRIPTION

FIGS. 3($a$), 3($b$), and 3($c$) are schematic views of electrical control circuits responsive in conjunction with the projector for simultaneous operation of the control panel.

Figure 4:
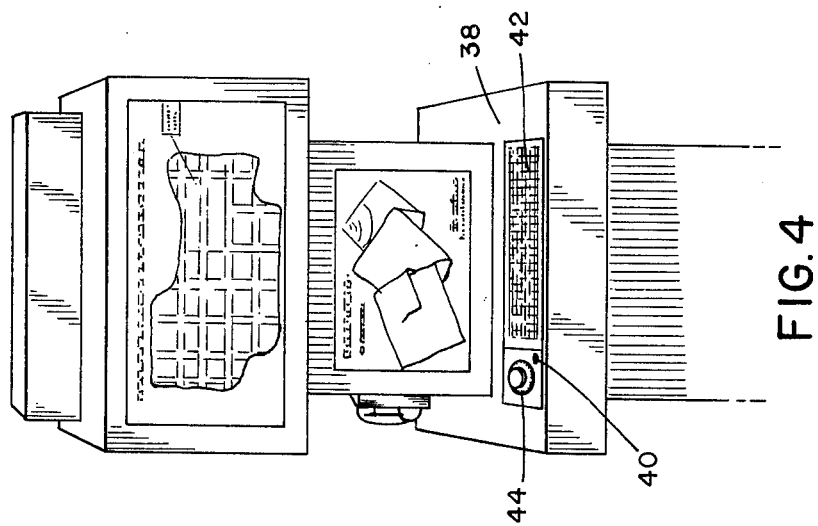

FIG. 4 is a perspective and fragmentary view of the shopping aid display viewer embodying the present invention showing the control panel.

DETAILED DESCRIPTION OF THE INVENTION

Figure 2:
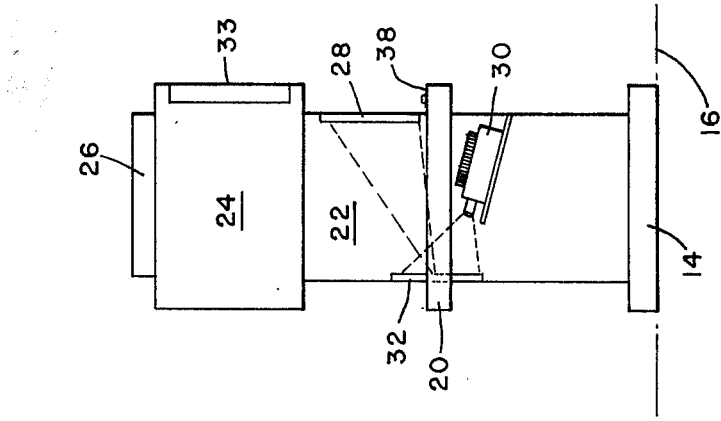
FIG. 2 is a transverse section taken on the line 2—2 of FIG. 1.
Figure 1:
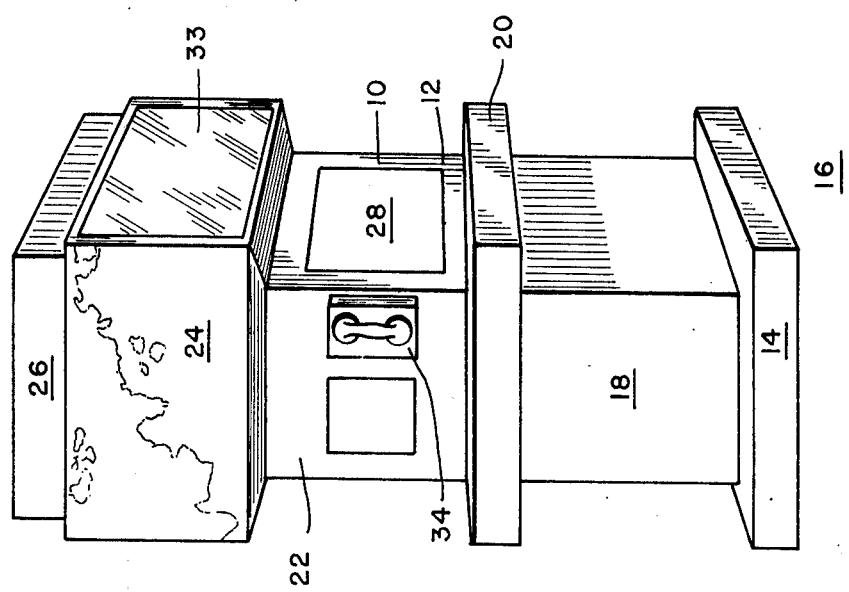
FIG. 1 is a perspective view of the shopping aid display viewer embodying the present invention.

With reference to the drawings, the shopping aid display viewer is shown generally in FIG. 1 as 10 and has a housing 12 which is in turn made up of a series of specific components. A base 14 engages a supporting surface 16 and is suitably adapted to maintain the housing on that surface in a stable condition. A lower vertical trunk 18 engages and extends upwardly from base 14 and is adapted to house a slide projector 30 as shown in FIG. 2. Counter 20 is supported by trunk 18 and carries a control panel shown generally as 38. An upper vertical trunk 22 holds various components subsequently to be described. A locator map display module 24 sits atop upper vertical trunk 22 and maintains a slightly recessed header 26 preferably used to display an illuminated advertisement deemed most appropriate for the contemplated location.

Upper vertical trunk 22 carries a daylight viewing screen 28 having a front and back side and being adapted for viewing from the front side images projected on the back side thereof. Slide projector 30 is maintained within housing 18 to project images of photographic slides on daylight viewing screen 28. A suitable mirror 32 is movably positioned within the housing to reflect images projected by the projector onto the back side of the screen.

A second viewing area 33 preferably carrying a locator map is supported by display module 24 and is constructed in conjunction with electronic circuitry that will permit programmed and actuated lights to appear at designated locations on the map as products, services, and the like are programmed and viewed during the normal operation of the viewer.

A telephone 34 is mounted on the upper vertical trunk 22 in the manner shown in FIG. 1 and is preferably equipped with an automatic dialing mechanism of conventional design that will permit the automatic dialing of the number of the outlet or address desired when activated by a user.

Control panel 38 contains a dial 44 for selection of a desired category with a hold button 40 and an area 42 containing space for 160 item or service classifications. For example, a consumer wishing to buy a handbag will turn the dial selector to the corresponding item number. This will connect and actuate the projector with the handbag section and cause it to commence the automatic presentation of slides on the screen for several outlets selling handbags.

The projector will automatically cycle through the slides of the outlets carrying handbags at, for example, ten-second intervals unless the customer depresses the "Hold" button 40 which suspends the automatic programmed presentation. Once an outlet or store has been selected, the consumer may turn the automatic dialer to outlet name corresponding in number with the outlet and will be immediately connected by telephone with the outlet for a specific discussion concerning choice, color, or other information about the desired product.

The automatic slide projector, locator map designating lights, and self-dialing telephone are controlled by an electrical circuit 50 illustrated in FIG. 3 and operating as described hereinafter. The slide projector used is preferably a Kodak RA-960 model, but it will be understood that various other models of slide projectors may be used with only certain minor modifications of the disclosed circuitry.

Figure 3A:
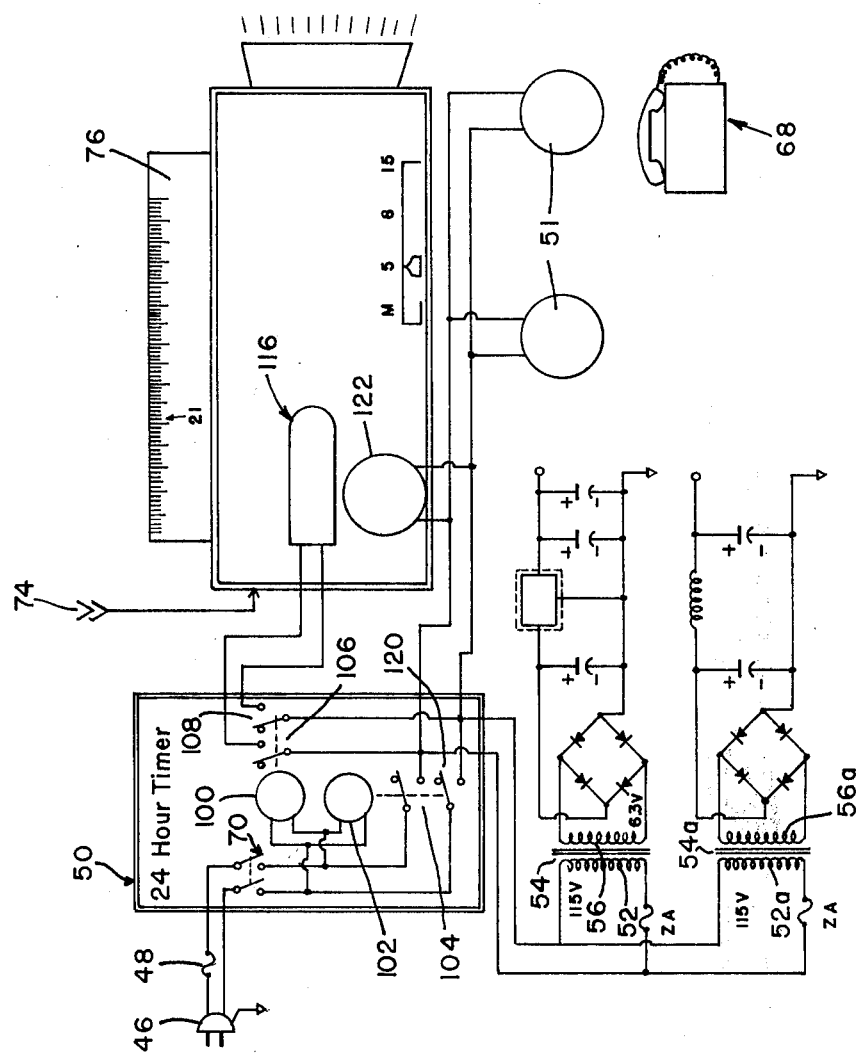
Figure 3B:
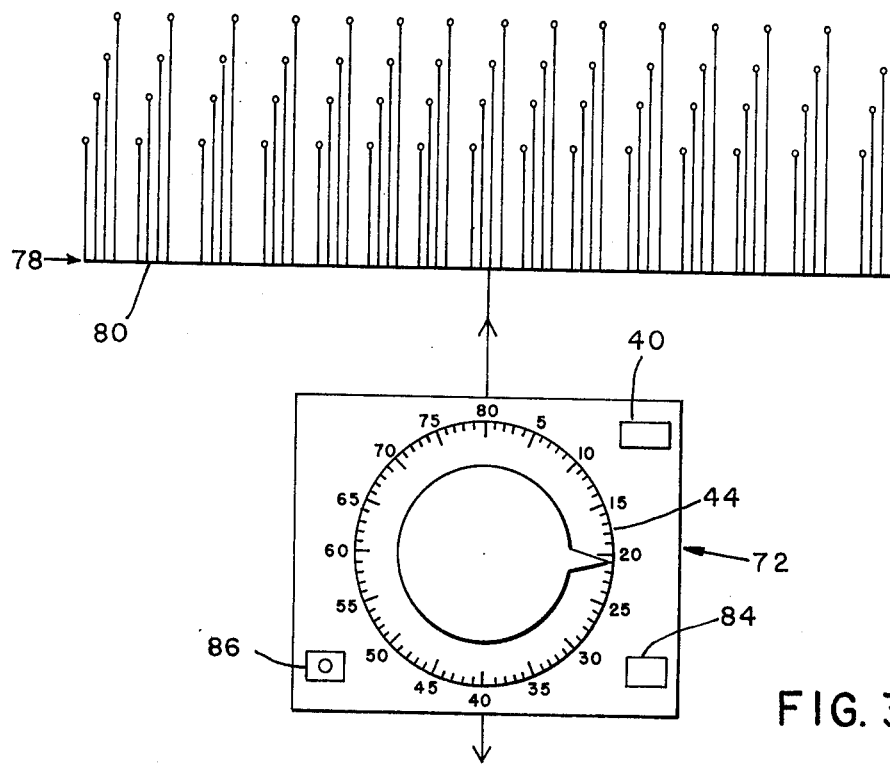
Figure 3C:
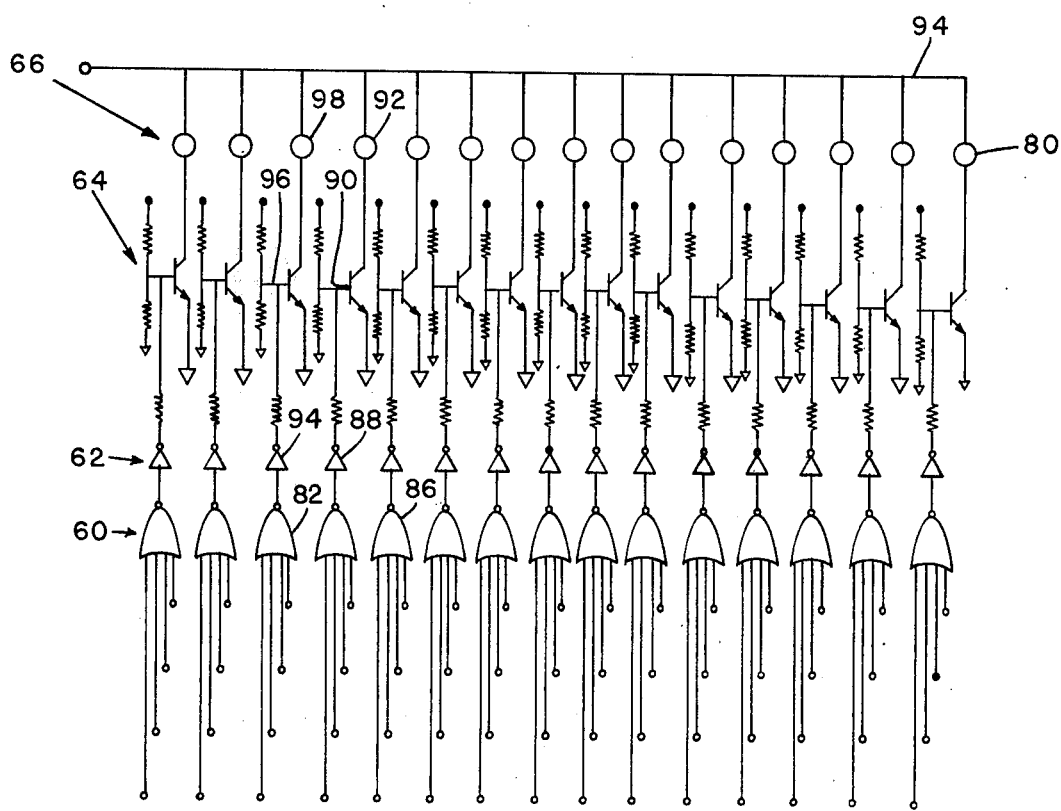

Referring to the circuits shown in FIGS. 3(a), 3(b), and 3(c), a power source 46 furnishing 110-120 volts AC is wired with a fuse 48 of appropriate size and a 24-hour timer 50 in series. The projector 30 and two cooling fans 51 are connected as shown. Also coupled to the timer 50 are the primary windings 52 and 52a of two step-down transformers 54 and 54a. One of the transformer secondary windings 56 has a 6.3 volt AC potential that is rectified and regulated at 6 volts DC to supply necessary power for the locator selector/driver circuits 60, 62, 64, and 66. The other transformer secondary winding 56a has a 6.3 volt AC potential, rectified, and filtered at 6 volts DC which supplies power for the automatic telephone dialing circuit 68. Control switch 70 (which could be remotely connected) is located on the projector. This functions as a time delay selector which allows the slides to be shown simultaneously at selected second intervals or to be controlled manually.

A selector control and monitor shown generally as 72 is connected to the projector 30 through a wiring harness 74 to operate the forward, reverse, and random selection of slides in the projector tray 76. A cable is connected to the selector control and monitor 72 and the locator selector/driver circuits 60, 62, 64, and 66. The selector control and monitor 72 has a dial 44 which is graduated in increments numbering from one through eighty. Positioning the dial 44 to any number, 1 through 80, causes the projector 30 to display the corresponding slide in the tray 76. Also located on the selector control monitor 72 is a hold button 40 which allows the viewer to hold a selected slide for prolonged viewing. Two display windows 84 and 86 are also carried by the selector control and monitor 72. Window 84 displays the slide that is being viewed, and window 86 will display the slide number when a random selection is made. Thus, if window 84 displays number 21 and a random selection is made by moving dial 44 to number 47, the number 47 will appear in window 84 showing the number dialed. Immediately the projector slide tray 76 will advance to the number 47 slide. When that slide is in viewing position, the number 47 will also appear in window 84. Another cable 78 connects the selector control and monitor 72 to the locator selector/driver circuits 60, 62, 64, and 66, which will ultimately give the viewer a positive means of locating the retail store or the like that has been selected. This is accomplished by illuminating a pin light 80 which will be placed at the proper location on a city map. Operation of the locator circuits 60, 62, 64, and 66 is precisely in register with the slide tray 76 and the display window 84 of the selector control and monitor 72.

The normal operation is as follows. The projector 30 is operating, and the time delay is set for 10 seconds. The projector 30 is displaying slide number 49, and the display window 84 of the selector control and monitor 72 displays the number 49. The MC14002CP "nor" gate 86 will go high at its input causing the output to be low. The input to the MC14049CP hex inverter 88 is now low causing the output to go high. This high level signal causes transistor 90 to be forwardly biased allowing it to conduct. The path for current is through transistor 90, through pin light 92 to common 94. Thus, pin light 92 illuminates, giving the location of the outlet on a specific map as well as slide information.

If the user desires to view information at position number 3 obtained from the index, he dials number 3 at selector control and monitor 72 by rotating the dial 44 to number 3. Display window 86 will give a visual indication to the user that number 3 has been dialed by displaying that number. Display window 84 will display the slide number 49. Immediately the projector slide tray 76 will advance to the number 3 position. At the same time selector control and monitor display window 84 will indicate that the number 3 slide is positioned for viewing. The MC14002CP "nor" gate 82 will go high at its input causing the output to be low. The input of the MC14049CP hex inverter 94 is now low causing the output to go high. This high level signal causes transistor 96 to be forwardly biased allowing it to conduct. The path for current is through transistor 96, through pin light 98 to common 94. Thus, pin light 98 illuminates, giving the location of the outlet on a specific map as well as slide information. At any time the slide is viewed, the hold button 40 of the selector control and monitor 72 may be depressed allowing the user to view the slide projection and locator pin light indefinitely. This is accomplished electrically by opening the time delay circuit of the projector 30. If the hold button 40 is not depressed, slide number 3 will be displayed for a preselected time (depending on the setting) and then automatically advance to the next slide. This cycle will repeat as long as the projector 30 is powered.

The projector 30 can be powered at any time during a 24-hour period simply by the setting of the timer contacts. For example, a source of power at 115 volts AC can be supplied to the 24-hour timer 50 at all times through control switch 70. The timers 100 and 102 are also powered at all times, and 115 volts AC is available at contacts 104. The start time would be the same setting for timers 100 and 102. Consequently, when the start time is reached, contacts 100 transfer causing a circuit to be made from contacts 106 to 108. At the same time contacts 102 transfer causing a circuit to be made from contacts 104 to contacts 120. Contacts 120 apply power to the projector cooling fan 49 and the enclosure cooling fans 51, to the primary windings of transformers 54 and 54a, and to the projector lamp 116 through the closed circuitry timer's contacts 106 to 108. When the turn off time of the projector 30 is reached, timer 100 will be set to disengage the circuit contacts 106 and 108 approximately 15 to 30 minutes prior to timer 102. This will allow the projector lamp 116 to be switched off and ample cooling to occur before the circuit is interrupted by the contacts 104 and 120 of the timer. When the timer 102 is set to connect contacts 104 and 120, all power to the projector cooling fan 49, the enclosure cooling fans 51, and the primary windings 52 and 52a of transformers 54 and 54a will be discontinued.

Switch 70 of timer 50 may be switched off at any time for changes and maintenance.

Obviously the present invention can incorporate any number of items such as ladies' shoes, gifts, men's fashions, handbags, or any other product or service that an advertiser may wish to display to a potential customer. Moreover, it has a vast number of applications in other generally related areas, such as the choice and location of motels, state welcome centers for displaying visitor attractions, airports (for displaying advertising or for flight time schedules), shopping malls to help a consumer locate an item, service, or a particular store, and the like. Furthermore, it can be used by real estate agencies to show apartments or homes to interested clients without leaving their offices. Finally, it would find widespread use in the selection by vacationers of recreational areas to select their accommodations and to select golf courses, recreational areas, historical sites, restaurants, and the like.

The locator map, associated circuitry, and selector slides can be readily changed to convert the viewer from one mode of information to another. For an attractive and efficient unit, a construction of one-half to three-quarters inch plexiglass is preferred with hinged sections included to provide ready access to the interior of the housing. While proper ventilation should move the heat rising from the projector out of the unit in an efficient manner, general small strategically positioned fans can be included if desired.

While there has been illustrated and described herein a preferred embodiment of a shopping aid display viewer, it will be understood that modifications and variations of that embodiment may be resorted to without departing from the spirit of the invention and the scope of the appended claims.

I claim:

1. A shopping aid display viewer comprising: a housing having a daylight viewing screen formed therein, said screen having a front and back side and being adapted for viewing from the front side images projected on the back side thereof; a slide projector for projecting images of photographic slides bearing information about purchasable products and the like on said screen; mirror means arranged to reflect images bearing information projected by said slide projector onto the back side of said viewing screen; a second viewing area carried by said housing having a front and back side and being adapted for viewing from outside said housing; a locator map displayed on said second viewing area; means associated with said locator map selectively indicating thereon upon actuation a specific location where said purchasable product and the like may be found; automatic telephonic means supported by said housing; a control panel having means to selectively and automatically control said projector, said locator map associated means, and said telephonic means whereby an image bearing information about purchasable products and the like can be projected on said viewing screen, a location for purchasing such products and the like can be designated on the locator map, and the location can be connected automatically through the telephone means.

2. The viewer of claim 1 wherein said slide projector will accommodate 40, 80, or 160 35mm slides.

3. The viewer of claim 1 wherein said projector has a timer to automatically advance the slides at a predetermined frequency and in a prearranged order for projection on said viewing screen.

4. The viewer of claim 3 wherein the advancement of the slides by said projector can be manually changed.

5. The viewer of claim 1 wherein said housing is formed of plexiglass.

6. The viewer of claim 1 wherein the image projected on said viewing screen is a consumer product or service, said locator map associated means is a light on said locator map designating a retail outlet or location selling said product or service, and said telephone means will make contact automatically with the outlet upon actuation.

7. The viewer of claim 4 wherein the image projected on said viewing screen is a recreation area, said locator map associated means is a light on said locator map designating the area, and said telephonic means will make contact automatically with the area upon actuation.

8. The viewer of claim 1 wherein said housing has a base contiguously positioned against a supporting surface, a lower vertical trunk extending upwardly from said base, a control panel counter module supported by said lower trunk, an upper vertical trunk carrying said viewing screen and said telephonic means, a locator map display module proximate said upper vertical trunk, and a header topping said module.

9. The viewer of claim 2 wherein said housing has a base contiguously positioned against a supporting surface, a lower vertical trunk extending upwardly from said base, a control panel counter module supported by said lower trunk, an upper vertical trunk carrying said viewing screen and said telephonic means, a locator map display module proximate said upper vertical trunk, and a header topping said module.

10. The viewer of claim 4 wherein said housing has a base contiguously positioned against a supporting surface, a lower vertical trunk extending upwardly from said base, a control panel counter module supported by said lower trunk, an upper vertical trunk carrying said viewing screen and said telephonic means, a locator map display module proximate said upper vertical trunk, and a header topping said module.

* * * * *